Jan. 5, 1943.  H. B. HILEMAN  2,307,371
MOLDING PROCESS
Filed Aug. 13, 1941
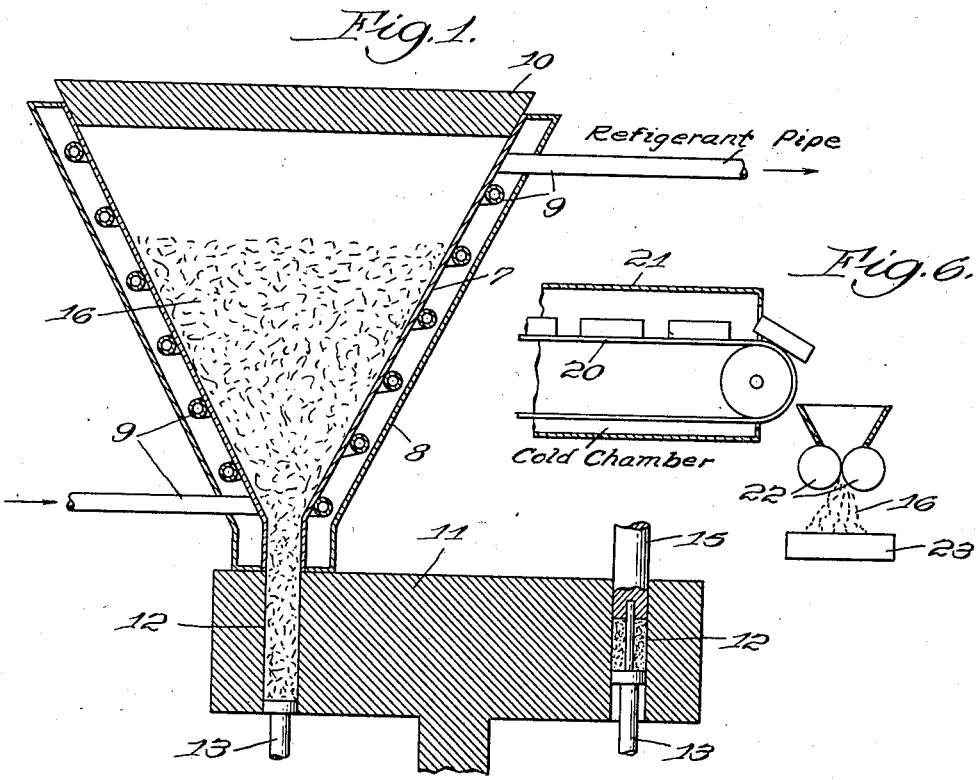
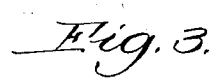
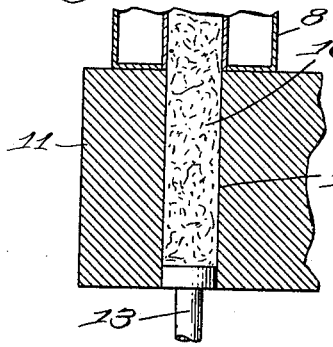
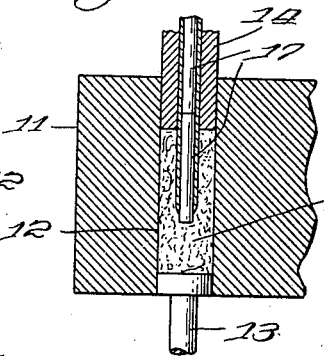
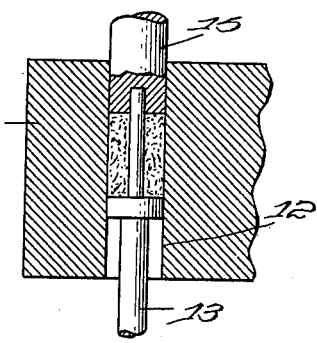
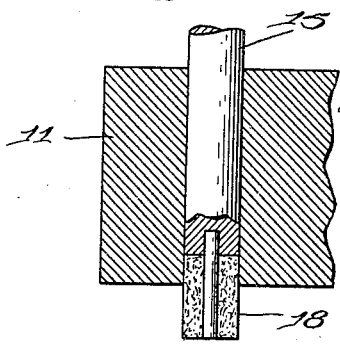
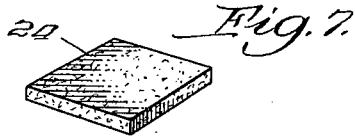
Inventor:
Howard B. Hileman,
By Chritton, Wiles, Davis & Hirsch.
Attys.

Patented Jan. 5, 1943

2,307,371

UNITED STATES PATENT OFFICE 2,307,371

MOLDING PROCESS

Howard B. Hileman, Lancaster, Ohio, assignor to Ray-O-Vac Company, a corporation of Wisconsin Application August 13, 1941, Serial No. 406,690

7 Claims. (Cl. 136—124)

This invention relates to an improved molding process wherein a material or combination of materials containing moisture is sharply frozen, pulverized to a free flowing granular state and then introduced into a mold and compressed into a solid mass of desired shape.

The primary object of the invention is to facilitate handling of the molding material during the practice of the process and enable the operator to control the moisture content and easily and accurately measure the amount of material used. The invention is capable of adaptation to many molding processes, such as the formation of pills and the like, but will be described more particularly in its adaptation to the making of electric battery cores or bobbins used in dry cells. Another object of the invention is to transform the molding material into a free-flowing granular form which is adapted to large scale manufacturing operations utilizing pressure molding machines at a much higher rate than was heretofore feasible.

Another object of the invention, when used in handling the depolarizing mix of dry cells, is in that the mix at low temperatures is much less corrosive and abrasive so that less expensive materials may be used in the mold and machine parts which come directly in contact with the material. For example, a depolarizing mix ordinarily contains manganese dioxide, graphite (or carbon), zinc chloride solution, ammonium chloride, or similar materials with water added for the solution of the chlorides, and it has been necessary to make the parts of the machine which come in contact with the mix of very expensive corrosion and abrasion resistant material in order to secure a longer service life for the molds and machine parts. Alloys of cobalt and nickel, known commercially as "Stellite," are sometimes used. In the present method the corrosive action is greatly reduced.

In my Patent No. 2,262,734, issued November 11, 1941, as a result of an application filed September 6, 1940, is shown a method of molding depolarizing mix and then freezing it in the mold. In the present method, a similar bobbin is obtained but the depolarizing mix is frozen before it is introduced into the compression mold.

The invention is illustrated diagrammatically in a preferred embodiment, in the accompanying drawing, in which Figure 1 is a diagrammatic sectional view of an automatic machine for forming bobbins for dry cells; Figure 2, a fragmentary sectional view showing a measured amount of frozen granular depolarizing mix filling a socket in the turret of the machine; Figure 3 is a similar view showing a plunger forcing a carbon electrode into the mix; Figure 4 is a similar view showing the depolarizing mix being compressed around the carbon electrode; Figure 5 is a similar view showing the finished bobbin being ejected from the turret; Figure 6 illustrates diagrammatically how the depolarizing mix may be frozen on an endless belt passing through a freezing chamber and pulverized by crushing rolls; and Figure 7 shows a cake or tablet of compressed depolarizing mix of the type used in "Layer-bilt" batteries which do not have an embedded carbon electrode and can easily be made in an automatic machine of the general type shown in Figure 1.

In the embodiment illustrated in Figures 1–5, an automatic machine for making the bobbin is shown diagrammatically. It may have a suitable hopper 7 provided with an insulating shell 8 which is kept cool by means of a refrigerant circulated through coils of pipe 9. The hopper may be closed by a suitable cover 10.

Beneath the hopper is shown a rotatable turret 11 provided with a series of sockets 12. Each socket is provided at its lower side with a plunger 13 which turns with the turret, and suitable travelling plungers 14 and 15 are provided above the turret to successively enter the advancing sockets 12 as will be described below.

In handling the ordinary depolarizing mix it has always been difficult to measure accurately the agglomerate composed of the materials mentioned above, because it does not flow freely, and when slight pressure is applied to it, a cake is formed which has a tendency to block any opening into the mold and prevent the mold from being properly filled. In practicing the present invention, after the molding material has been properly tempered with moisture, it is cooled considerably below its freezing point so as to become very hard and brittle. It is preferred to freeze the ordinary battery mix to a temperature in the neighborhood of 30° below zero F. The frozen material is then pulverized by passing it through spaced pulverizing rolls and broken down to a finely divided granular form 16. This is easily accomplished because the material becomes very brittle at very low temperatures. The granular pulverized material may then be introduced into a mold by permitting it to flow into a socket 12 of about twice the size of the desired final structure, or measured amounts can be introduced which have previously been weighed or measured. Pressure may then be applied by means of the plungers, and a dense hard body appears to be formed. The action is similar to that of taking a handful of loose snow on a very cold day and compressing it with considerable pressure into a ball. The pressure causes some initial melting and this in turn results in very close adherence of the granules and subsequently forming a very hard, completely frozen, mass.

As shown in Figure 2, after a socket 12 is filled, the turret moves, shutting off the supply of material and advancing to the position shown in Figure 3 where the hollow plunger 14 enters the socket and forces a carbon pencil electrode 17 down into the mix 16. The plunger 14 then withdraws and when the turret reaches the position shown in Figure 4 another plunger 15 enters the socket 12 from above and the plunger 13 is thrust upwardly from below to compress the mix into its final form. In the last position shown in Figure 5, the plunger 13 is withdrawn and the plunger 15 ejects the completed bobbin 18 from the turret into a hopper 19. If preferred, the machine can be arranged so that the completed bobbin will be ejected upwardly by the plunger 13.

The bobbin 18 when leaving the machine, as explained above, is a solid frozen unit which may be subjected to rather a rough handling without breakage. It is preferred to introduce it into the cup of a dry cell containing electrolyte while still frozen and retaining its moisture. If desired the frozen bobbins may be stored in a low temperature compartment until needed. The frozen bobbins can be introduced into cell cups without fragmentation or breakage. The bobbin does not disintegrate in the cell when it thaws out and is as satisfactory as the ordinary bobbin.

The molding process may be performed in ordinary molding machines in a very cold chamber or where the working parts of the machine may be kept sufficiently cool by artificial refrigeration. It has been found that the process can also be operated at high speed with machines similar to those used in manufacturing pills or tablets.

If desired, the process may be carried out by passing the molding material on an endless belt 20 through a sharp freezing chamber 21 and running it through crushing rolls 22 at the other end of the chamber. The granular material 16 may be stored in boxes or trays 23, but preferably after being pulverized should be kept at a temperature of not less than 14° below zero F., if the ordinary depolarizing mix is the material used. The material may be fed into the machine through a feed hopper which, as indicated above, should be held at a very low temperature.

The process is particularly well adapted to the formation of depolarizing cakes or tablets 24 of the shape shown in Figure 7 that are used in what is known in the trade as "Layer-bilt" batteries.

After the cores or tablets 24 are formed, they may be introduced into metal electrode cans containing electrolyte in the usual manner. It is not essential, however, to maintain the low temperature of the core or bobbin after it is formed, because it is found that upon thawing out, the molding material remains in a strong dense condition and may be handled as easily as the wrapped bobbins heretofore commonly employed.

The foregoing detailed description has been given for clearness of understanding only, and no unnecessary limitations should be understood therefrom for some modifications will be obvious to those skilled in the art.

I claim:
1. The method of forming pressed molded structures of molding material containing moisture, which comprises: introducing a measured amount of sharply frozen moist pulverized granular material into a mold; and compressing the frozen material in the mold sufficiently to cause it to cake into a hard mass.

2. The method of forming pressed molded structures of molding material containing moisture, which comprises: pouring moist pulverized material, frozen to a temperature below 15° F., into a mold of desired shape; compressing the material in the mold to cause it to cake into a dense body; and removing the body from the mold.

3. The method of forming pressed molded structures of molding material containing moisture, which comprises: causing moist granular material, frozen to a temperature below 15° F., to flow into a mold under the influence of gravity; compressing the material in the mold into a dense cake; and removing the cake from the mold.

4. The method of forming battery cores which comprises pulverizing a moist depolarizing mix, frozen sharply below its freezing point, to render it free flowing and introducing a measured amount of the pulverized mix into a mold; compressing the frozen mix to form a hard core; and removing the core from the mold.

5. The method of forming battery cores which comprises tempering with moisture to a desired degree a depolarizing mix containing manganese dioxide, carbon, and chloride material, cooling said tempered mix to a temperature in the neighborhood of 30° below zero F.; pulverizing the frozen mix into a finely divided granular condition; introducing a measured amount of the frozen granular mix into a mold; compressing the granular mix into a hard core; and removing the core from the mold.

6. The method of forming battery cores which comprises tempering with moisture to a desired degree a depolarizing mix containing manganese dioxide, carbon, and chloride material and freezing said tempered mix to a temperature in the neighborhood of 30° below zero F.; pulverizing the frozen mix into a finely divided granular condition; introducing a measured amount of the frozen granular mix into a mold around a solid electrode; compressing the frozen mix around the electrode into a hard cake adhering to said electrode; and removing the core with its electrode from the mold.

7. The method of forming battery cores which comprises tempering with moisture to a desired degree a depolarizing mix containing manganese dioxide, carbon, and chloride material; freezing said tempered mix to a temperature in the neighborhood of 30° below zero F.; pulverizing the frozen mix into a finely divided granular condition; permitting a measured amount of the frozen granular mix to flow into a mold; inserting a battery electrode into said pulverized frozen mix in the mold, tamping said mix to form a solid cake adhering to said electrode; and removing the core from the mold.

HOWARD B. HILEMAN.

CERTIFICATE OF CORRECTION.

Patent No. 2,307,371. January 5, 1943.

HOWARD B. HILEMAN.

It is hereby certified that error appears in the printed specification of the above numbered patent requiring correction as follows: Page 2, second column, lines 14 and 22, claims 2 and 3, for "below $15°$" read --below $-15°$--; line 37, claim 5, before "cooling" insert --and--; and that the said Letters Patent should be read with this correction therein that the same may conform to the record of the case in the Patent Office.

Signed and sealed this 23rd day of February, A. D. 1943.

(Seal)

Henry Van Arsdale,
Acting Commissioner of Patents.